(12) United States Patent
Perfetto et al.

(10) Patent No.: US 11,512,653 B2
(45) Date of Patent: *Nov. 29, 2022

(54) VALVE TRAIN WITH CYLINDER DEACTIVATION AND COMPRESSION RELEASE

(71) Applicant: Cummins Inc., Columbus, IN (US)

(72) Inventors: Anthony Kyle Perfetto, Columbus, IN (US); Anshul Shambhav, Glenview, IL (US); Adam C. Cecil, Columbus, IN (US); Ryan Edward Schultz, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/378,996

(22) Filed: Jul. 19, 2021

(65) Prior Publication Data

US 2021/0340921 A1    Nov. 4, 2021

Related U.S. Application Data

(63) Continuation of application No. 16/902,728, filed on Jun. 16, 2020, now Pat. No. 11,092,088, which is a
(Continued)

(51) Int. Cl.
*F02D 13/04* (2006.01)
*F01L 1/047* (2006.01)
(Continued)

(52) U.S. Cl.
CPC .............. *F02D 13/04* (2013.01); *F01L 1/047* (2013.01); *F01L 13/0036* (2013.01);
(Continued)

(58) Field of Classification Search
CPC ...... F02D 13/04; F02D 13/0207; F02D 13/06; F01L 1/047; F01L 13/0036; F01L 13/06; F01L 2760/004
(Continued)

(56) References Cited

U.S. PATENT DOCUMENTS 4,930,463 A    6/1990    Hare, Sr.
5,103,779 A    4/1992    Hare, Sr.
(Continued)

FOREIGN PATENT DOCUMENTS

CN    102165149 A    8/2011
CN    104321577 A    1/2015
(Continued)

OTHER PUBLICATIONS

Search Report and Written Opinion, PCT Appln. No. PCT/US2017/066953, 10 pgs. dated Feb. 15, 2018.
(Continued)

*Primary Examiner* — Mahmoud Gimie
(74) *Attorney, Agent, or Firm* — Taft, Stettinius & Hollister LLP

(57) ABSTRACT

An internal combustion engine system includes an engine with a plurality of pistons housed in respective ones of a plurality of cylinders, an air intake system to provide air to the plurality of cylinders through respective ones of a plurality of intake valves, an exhaust system to release exhaust gas from the plurality of cylinders through respective one of a plurality of exhaust valves. A valve train is provided for cylinder deactivation of a first part of the plurality of cylinders and compression release braking on a second part of the plurality of cylinders.

17 Claims, 10 Drawing Sheets

Related U.S. Application Data continuation of application No. PCT/US2017/066953, filed on Dec. 18, 2017.

(51) Int. Cl.
| | |
|---|---|
| *F01L 13/06* | (2006.01) |
| *F02D 13/06* | (2006.01) |
| *F01L 13/00* | (2006.01) |
| *F02D 13/02* | (2006.01) |

(52) U.S. Cl.
CPC .......... *F01L 13/06* (2013.01); *F02D 13/0207* (2013.01); *F02D 13/06* (2013.01); *F01L 2760/004* (2013.01)

(58) Field of Classification Search
USPC ........................................................ 123/321
See application file for complete search history.

(56) References Cited

U.S. PATENT DOCUMENTS

| | | |
|---|---|---|
| 6,293,248 B1 | 9/2001 | Zsoldos et al. |
| 6,354,266 B1 | 3/2002 | Cornell et al. |
| 6,470,851 B1 | 10/2002 | DeGroot et al. |
| 6,951,198 B1 | 10/2005 | Megli et al. |
| 7,900,597 B2 | 3/2011 | Meneely et al. |
| 8,789,502 B2 | 7/2014 | Barnes |
| 8,869,772 B2 | 10/2014 | Hisaminato et al. |
| 9,234,467 B2 | 1/2016 | Ernest et al. |
| 9,376,941 B2 | 6/2016 | Yang |
| 2004/0231639 A1 | 11/2004 | Israel et al. |
| 2008/0041336 A1 | 2/2008 | Gibson et al. |
| 2010/0024767 A1 | 2/2010 | Meneely et al. |
| 2014/0034010 A1* | 2/2014 | Serrano ............... F02D 41/0087 123/324 |
| 2014/0251266 A1 | 9/2014 | Emmons et al. |
| 2015/0000630 A1 | 1/2015 | Coldren |
| 2016/0281612 A1 | 9/2016 | Toth et al. |
| 2017/0044998 A1 | 2/2017 | Holub et al. |
| 2020/0011257 A1 | 1/2020 | Stretch et al. |
| 2020/0088073 A1 | 3/2020 | Baltrucki et al. |

FOREIGN PATENT DOCUMENTS

| | | |
|---|---|---|
| EP | 1803913 A2 | 7/2007 |
| WO | 2016036936 A1 | 3/2016 |
| WO | 2017127219 A1 | 7/2017 |

OTHER PUBLICATIONS

Office Action, Counter CN Application No. 201780098279.3, 11 pgs., dated Mar. 10, 2022.

\* cited by examiner

VALVE TRAIN WITH CYLINDER DEACTIVATION AND COMPRESSION RELEASE

CROSS-REFERENCE TO RELATED APPLICATIONS

The present application is a continuation of U.S. patent application Ser. No. 16/902,728 filed on Jun. 16, 2020, which is a continuation of International Patent Application No. PCT/US17/66953 filed on Dec. 18, 2017, which is incorporated herein by reference in its entirety for all purposes.

BACKGROUND

The present invention relates to operation of an internal combustion engine system, and more particularly, but not exclusively, relates to cylinder deactivation and compression release of the internal combustion engine.

Cylinder deactivation at low engine loads can be accomplished by leaving the intake and exhaust valves of part of the engine cylinders closed during certain operating conditions to save fuel and operate with increased efficiency. Cylinder deactivation typically requires switching the cam profile that operates on the deactivated cylinders from a nominal profile to a zero profile.

Engine braking can be accomplished with variable geometry (VG) turbine inlets and/or by motoring. However, certain engines, such as those with low compression ratios and/or low exhaust backpressure, do not provide sufficient retarding capability under motoring conditions. Furthermore, VG turbochargers are costlier than wastegated turbochargers. Thus, there is a continuing demand for further contributions in this area of technology.

SUMMARY

Certain embodiments of the present application includes unique systems, methods and apparatus to regulate operation of an internal combustion engine using cylinder deactivation for part of the cylinders of the engine for low load efficiency improvement and compression release braking for another part of the cylinders in response to engine braking conditions. Other embodiments include unique apparatus, devices, systems, and methods involving the control of an internal combustion engine system via a combined cylinder deactivation and compression release braking valve train that is configured for four stroke and/or two stroke compression release braking.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION OF REPRESENTATIVE EMBODIMENTS

Figure 1:
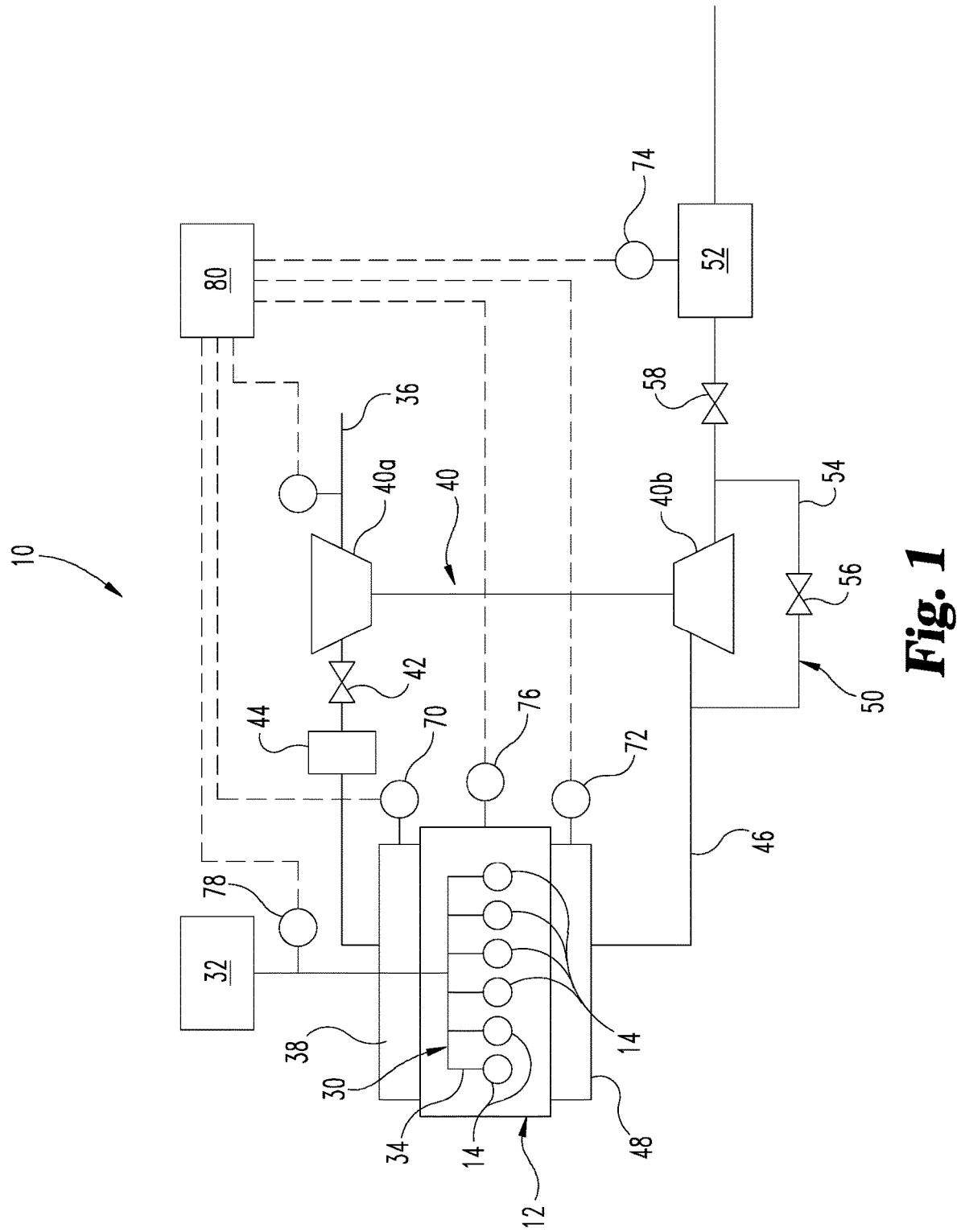
FIG. 1 is a schematic view of one embodiment of an internal combustion engine system operable to provide compression release braking and cylinder deactivation.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

With reference to FIG. 1, an internal combustion engine system 10 includes a four stroke internal combustion engine 12. Any engine type is contemplated, including compression ignition, spark-ignition, and combinations of these. The engine 12 can include a plurality of cylinders 14. FIG. 1 illustrates the plurality of cylinders 14 in an arrangement that includes six cylinders 14 in an in-line arrangement for illustration purposes only. Any number of cylinders and any arrangement of the cylinders suitable for use in an internal combustion engine can be utilized. The number of cylinders 14 that can be used can range from two cylinders to eighteen or more. Furthermore, the following description at times will be in reference to one of the cylinders 14. It is to be realized that corresponding features in reference to the cylinder 14 described in FIG. 2 and at other locations herein can be present for all or a subset of the other cylinders 14 of engine 12 unless noted otherwise.

Figure 2:
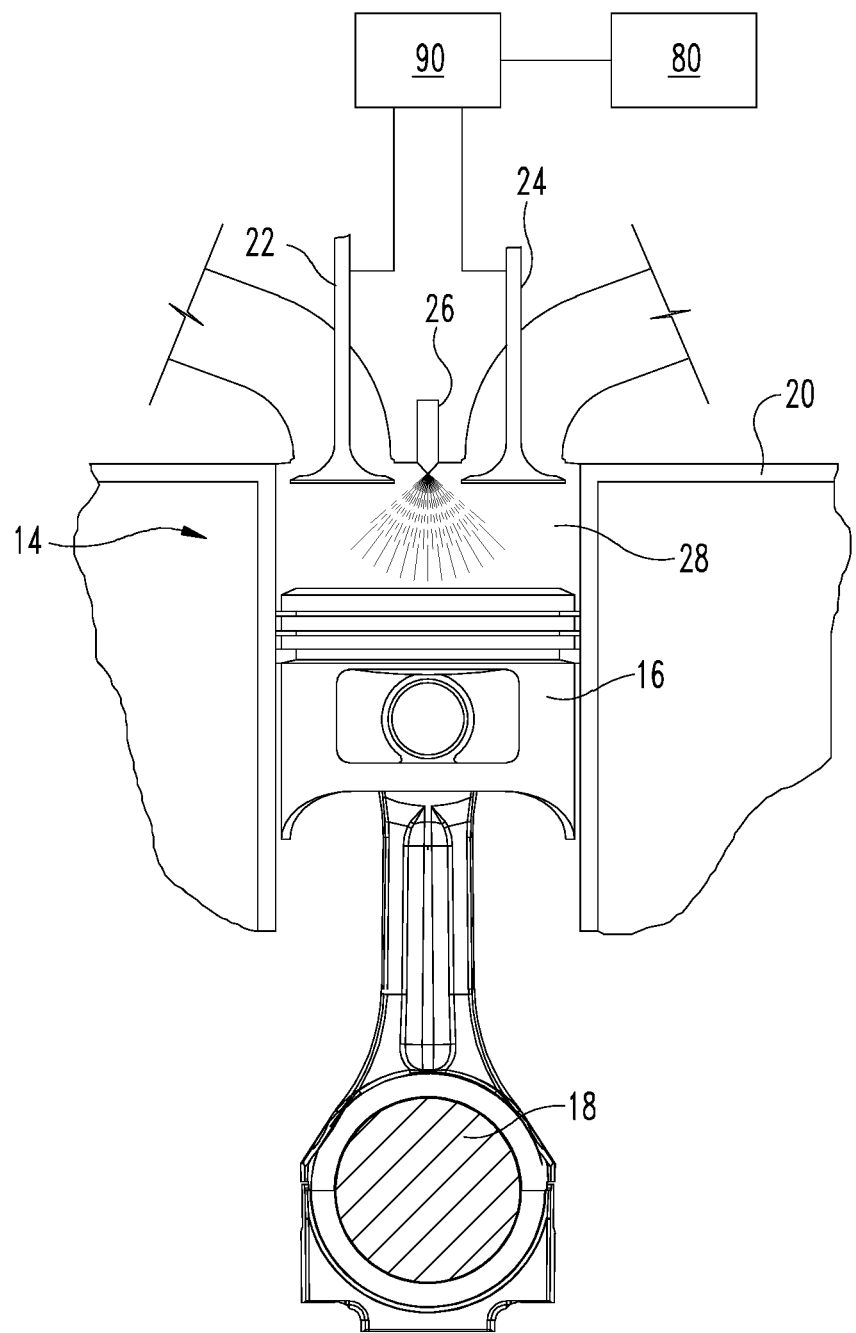
FIG. 2 is a diagrammatic and schematic view of one embodiment of a cylinder of the internal combustion engine system of FIG. 1 and a schematic of a valve actuation mechanism for compression release braking and cylinder deactivation.

As shown in FIG. 2, the cylinder 14 houses a piston 16 that is operably attached to a crankshaft 18 that is rotated by reciprocal movement of piston 16 in a combustion chamber 28 of the cylinder 14. Within a cylinder head 20 of the cylinder 14, there is at least one intake valve 22, at least one exhaust valve 24, and a fuel injector 26 that provides fuel to the combustion chamber 28 formed by cylinder 14 between the piston 16 and the cylinder head 20. In other embodiments, fuel can be provided to combustion chamber 28 by port injection, or by injection in the intake system, upstream of combustion chamber 28. Furthermore, in the discussion that follows, each cylinder 14 includes two intake valves 22 and two exhaust valves 24.

The term "four stroke" herein means the following four strokes—intake, compression, power, and exhaust—that the piston 16 completes during two separate revolutions of the engine's crankshaft 18, which is a combustion cycle. A stroke begins either at a top dead center (TDC) when the piston 16 is at the top of cylinder head 20 of the cylinder 14, or at a bottom dead center (BDC), when the piston 16 has reached its lowest point in the cylinder 14.

Figure 7:
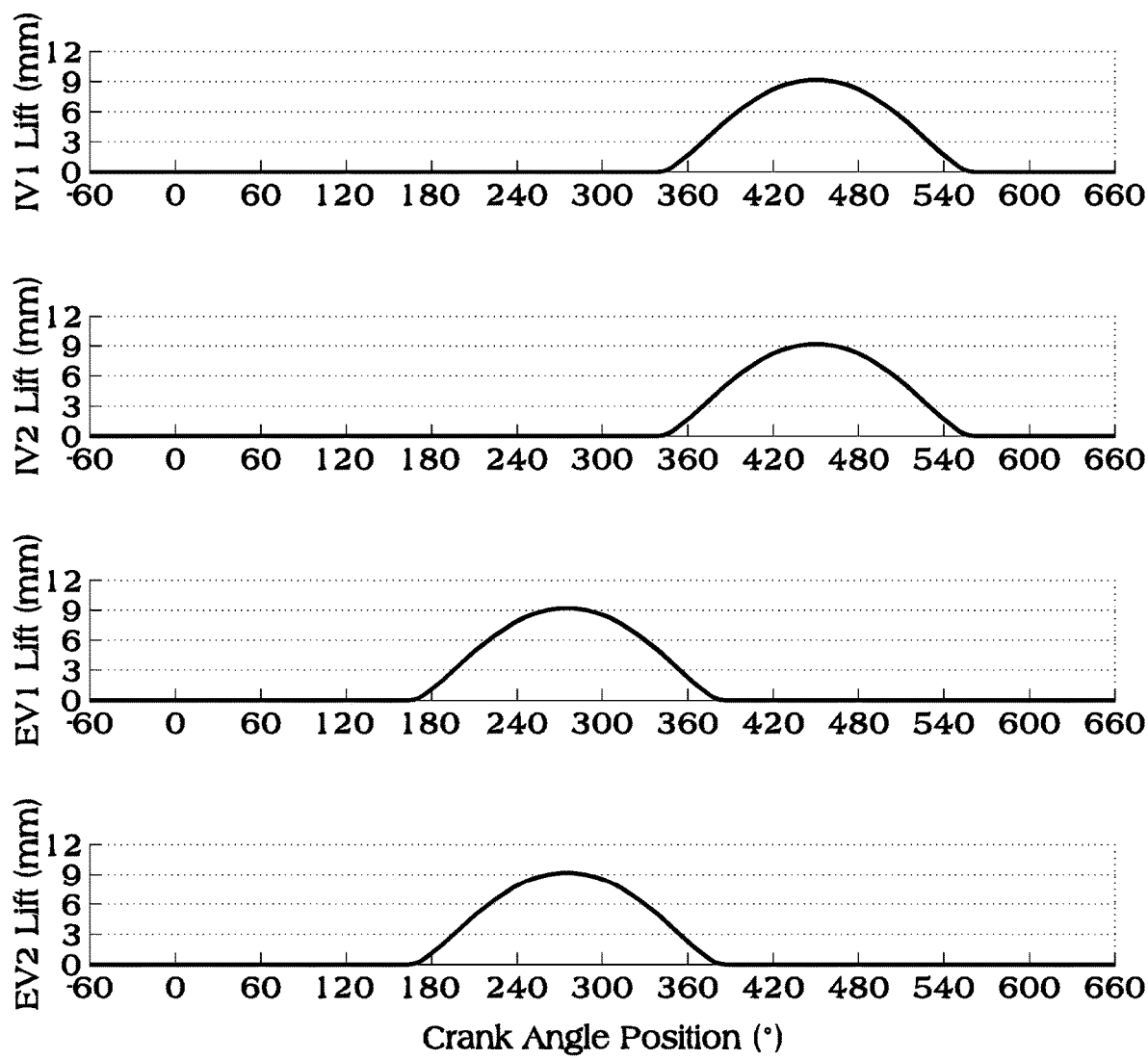
FIG. 7 is a graphical representation of an example nominal cam lobe profile for operating the intake valves and the exhaust valves of the cylinders of the internal combustion engine system of FIG. 1.

Referring further to FIG. 7, there is shown example nominal intake and exhaust valve opening and closing profiles during a combustion cycle for the two intake valves (IV1 and IV2) and the two exhaust valves (EV1 and EV2). During the intake stroke for IV1 and IV2, the piston 16 descends away from cylinder head 20 of the cylinder 14 to a bottom (not shown) of the cylinder, thereby reducing the pressure in the combustion chamber 28 of the cylinder 14. A combustion charge is created in the combustion chamber 28 by an intake of air through the intake valves 22 when the intake valves 22 are opened.

The fuel from the fuel injector 26 is supplied by, for example, a high pressure common-rail system 30 (FIG. 1) that is connected to the fuel tank 32. Fuel from the fuel tank 32 is suctioned by a fuel pump (not shown) and fed to the common-rail fuel system 30. The fuel fed from the fuel pump is accumulated in the common-rail fuel system 30, and the accumulated fuel is supplied to the fuel injector 26 of each cylinder 14 through a fuel line 34. The accumulated fuel in common rail system can be pressurized to boost and control the fuel pressure of the fuel delivered to combustion chamber 28 of each cylinder 14. However, any type of fuel delivery system is contemplated.

During the compression stroke in a non-engine braking mode of operation, the intake valves 22 and the exhaust valves 24 are closed as shown by IV1, IV2 and EV1, EV2 in FIG. 7. The piston 16 returns toward TDC and fuel is injected near TDC in the compressed air in a main injection event, and the compressed fuel-air mixture ignites in the combustion chamber 28 after a short delay. In the instance where the engine 12 is a diesel engine, this results in the combustion charge being ignited. The ignition of the air and fuel causes a rapid increase in pressure in the combustion chamber 28, which is applied to the piston 16 during its power stroke toward the BDC. Combustion phasing in combustion chamber 28 is calibrated so that the increase in pressure in combustion chamber 28 pushes piston 16, providing a net positive in the force/work/power of piston 16.

During the exhaust stroke, the piston 16 is returned toward TDC while the exhaust valves 24 are open, as shown by EV1 and EV2 in FIG. 7. This action discharges the burnt products of the combustion of the fuel in the combustion chamber 28 and expels the spent fuel-air mixture (exhaust gas) out through the exhaust valves 24. The next combustion cycle occurs using these same intake and exhaust valve opening closing profiles, unless a cylinder deactivation condition or a braking condition is determined, as discussed further below.

Referring back to FIG. 1, the intake air flows through an intake passage 36 and intake manifold 38 before reaching the intake valves 22. The intake passage 36 may be connected to a compressor 40a of a turbocharger 40 and an intake throttle 42. The intake air can be purified by an air cleaner (not shown), compressed by the compressor 40a and then aspirated into the combustion chamber 28 through the intake throttle 42. The intake throttle 42 can be controlled to influence the air flow into the cylinder and, as discussed further below, to vary the engine braking provided during compression release braking operation.

The intake passage 36 can be further provided with a cooler 44 that is provided downstream of the compressor 40a. In one example, the cooler 44 can be a charge air cooler (CAC). In this example, the compressor 40a can increase the temperature and pressure of the intake air, while the CAC 44 can increase a charge density and provide more air to the cylinders. In another example, the cooler 44 can be a low temperature aftercooler (LTA). The CAC 44 uses air as the cooling media, while the LTA uses coolant as the cooling media.

The exhaust gas flows out from the combustion chamber 28 into an exhaust passage 46 from an exhaust manifold 48 that connects the cylinders 14 to exhaust passage 46. The exhaust passage 46 is connected to a turbine 40b and a wastegate 50 of the turbocharger 40 and then into an aftertreatment system 52. The exhaust gas that is discharged from the combustion chamber 28 drives the turbine 40b to rotate. The wastegate 50 is a device that enables part of the exhaust gas to by-pass the turbine 40b through a passageway 54. Less exhaust gas energy is thereby available to the turbine 40b, leading to less power transfer to the compressor 40a. Typically, this leads to reduced intake air pressure rise across the compressor 40a and lower intake air density/flow. The wastegate 50 can include a control valve 56 that can be an open/closed (two position) type of valve, or a full authority valve allowing control over the amount of by-pass flow, or anything between. The exhaust passage 46 can further or alternatively include an exhaust throttle 58 for adjusting the flow of the exhaust gas through the exhaust passage 46. The exhaust gas, which can be a combination of by-passed and turbine flow, then enters the aftertreatment system 52.

Optionally, a part of the exhaust gas can be recirculated into the intake system via an EGR passage (not shown.) The EGR passage can be connected the exhaust passage upstream of the turbine 40b to the intake passage 36 downstream of the intake air throttle 42. Alternatively or additionally, a low pressure EGR system (not shown) can be provided downstream of turbine 40b and upstream of compressor 40a. An EGR valve can be provided for regulating the EGR flow through the EGR passage. The EGR passage can be further provided with an EGR cooler and a bypass around the EGR cooler.

The aftertreatment system 52 may include one or more devices useful for handling and/or removing material from exhaust gas that may be harmful constituents, including carbon monoxide, nitric oxide, nitrogen dioxide, hydrocarbons, and/or soot in the exhaust gas. In some examples, the aftertreatment system 52 can include at least one of a catalytic device and a particulate matter filter. The catalytic device can be a diesel oxidation catalyst (DOC) device, ammonia oxidation (AMOX) catalyst device, a selective catalytic reduction (SCR) device, three-way catalyst (TWC), lean NOX trap (LNT) etc. The reduction catalyst can include any suitable reduction catalysts, for example, a urea selective reduction catalyst. The particulate matter filter can be a diesel particulate filter (DPF), a partial flow particulate filter (PFF), etc. A PFF functions to capture the particulate matter in a portion of the flow; in contrast the entire exhaust gas volume passes through the particulate filter.

A controller 80 is provided to receive data as input from various sensors, and send command signals as output to various actuators. Some of the various sensors and actuators that may be employed are described in detail below. The controller 80 can include, for example, a processor, a memory, a clock, and an input/output (I/O) interface.

The system 10 includes various sensors such as an intake manifold pressure/temperature sensor 70, an exhaust manifold pressure/temperature sensor 72, one or more aftertreatment sensors 74 (such as a differential pressure sensor, temperature sensor(s), pressure sensor(s), constituent sensor(s)), engine sensors 76 (which can detect the air/fuel ratio of the air/fuel mixture supplied to the combustion chamber, a crank angle, the rotation speed of the crankshaft, etc.), and a fuel sensor 78 to detect the fuel pressure and/or other properties of the fuel, common rail 38 and/or fuel injector 26. Any other sensors known in the art for an engine system are also contemplated.

System 10 can also include various actuators for opening and closing the intake valves 22, for opening and closing the intake valves 22 and the exhaust valves 24, for injecting fuel from the fuel injector 26, for opening and closing the wastegate valve 56, for the intake throttle 42, and/or for the exhaust throttle 58. The actuators are not illustrated in FIG. 1, but one skilled in the art would know how to implement the mechanism needed for each of the components to perform the intended function. Furthermore, in one embodiment, the actuators for opening and closing the intake and exhaust valves 22, 24 is a valve actuation (VA) system 90, such as shown schematically in FIG. 2.

Figure 3:
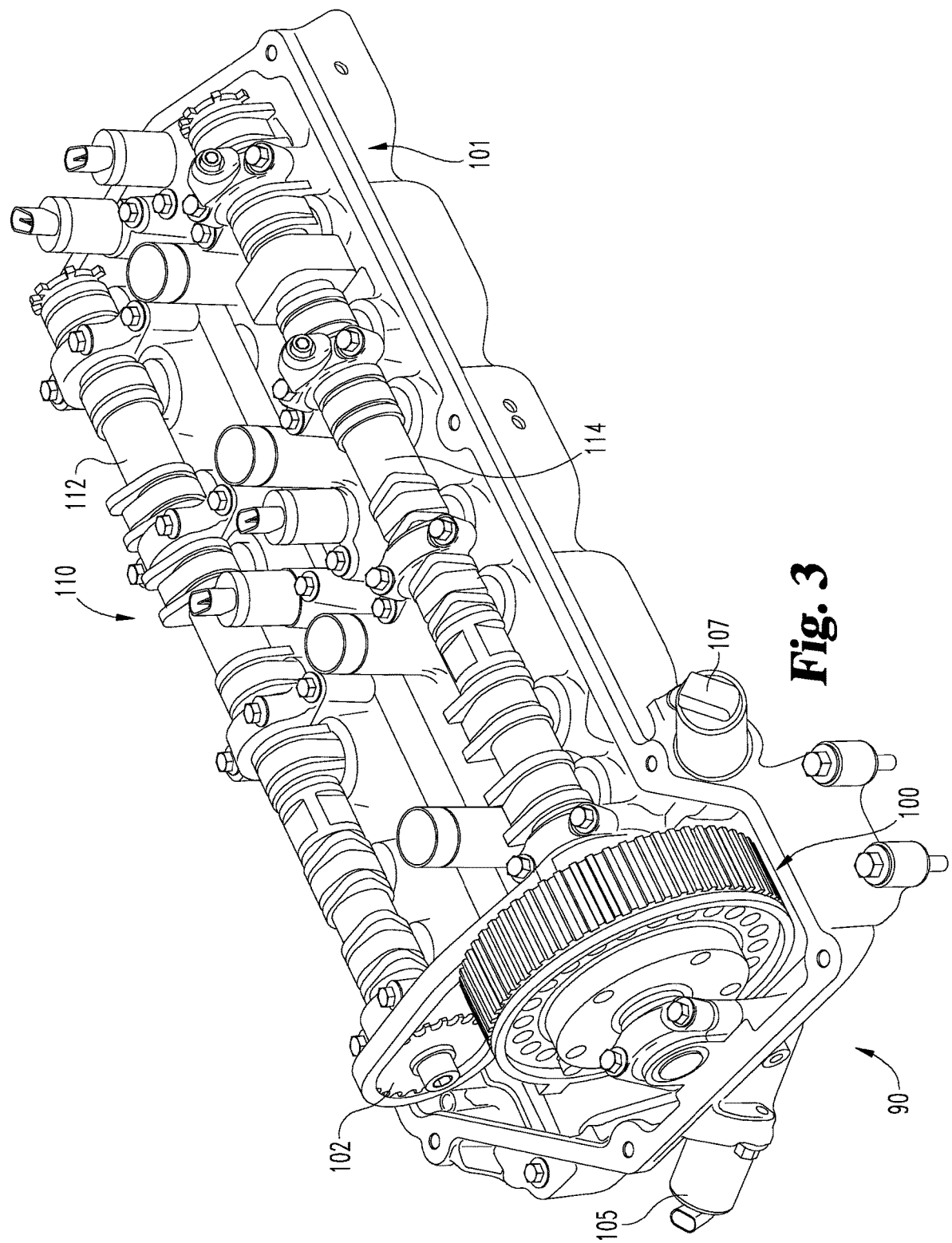
FIG. 3 is a perspective view showing a part of a valve train of the internal combustion engine with cam shaft phasers and cam shafts to operate cams having cam lobe profiles for compression release braking for one part of the cylinder and cylinder deactivation for another part of the cylinders.
Figure 4A:
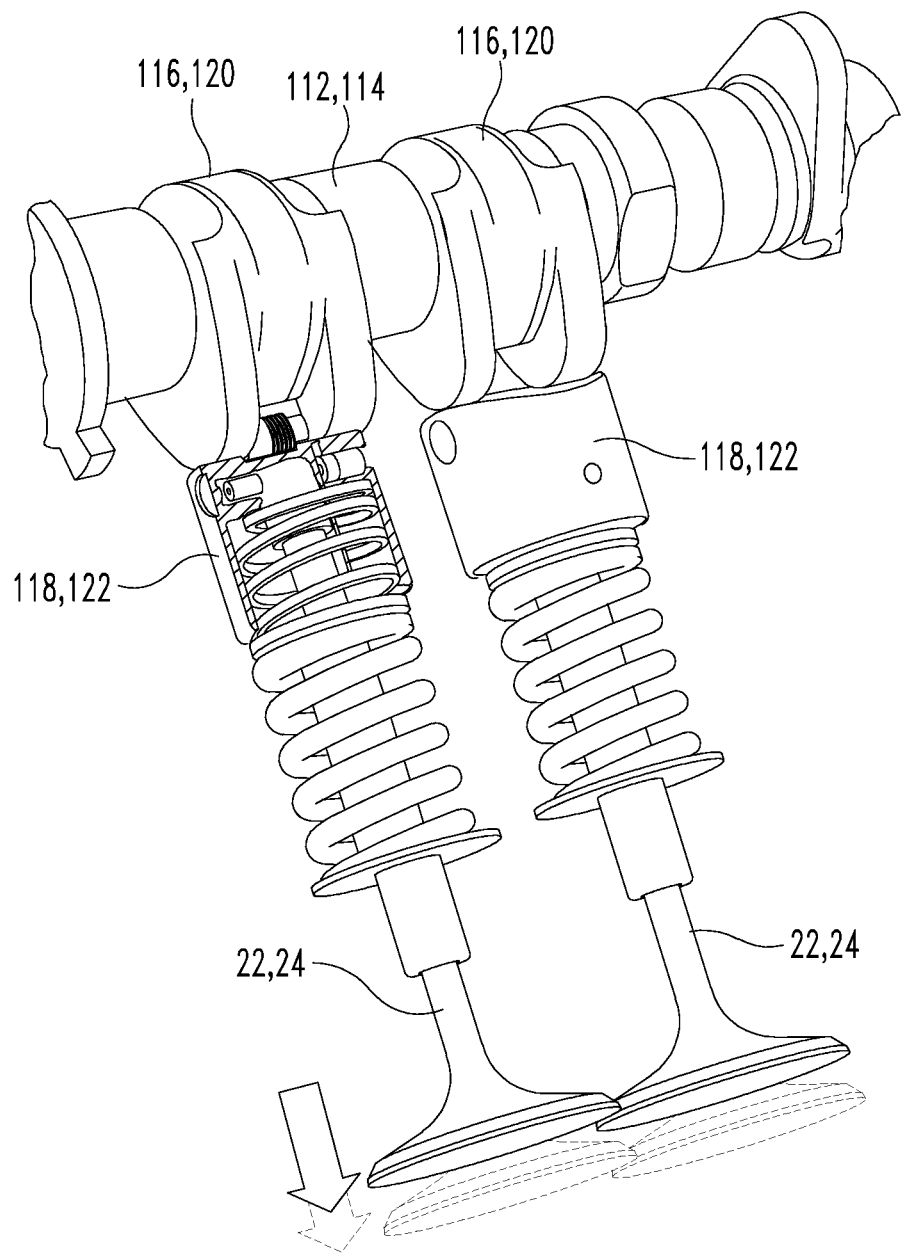
FIGS. 4A and 4B are perspective and sectional views, respectively, of the cam phasers and cam shafts with a cam of each cam shaft engaged to an intake valve and an exhaust valve, respectively.
Figure 4B:
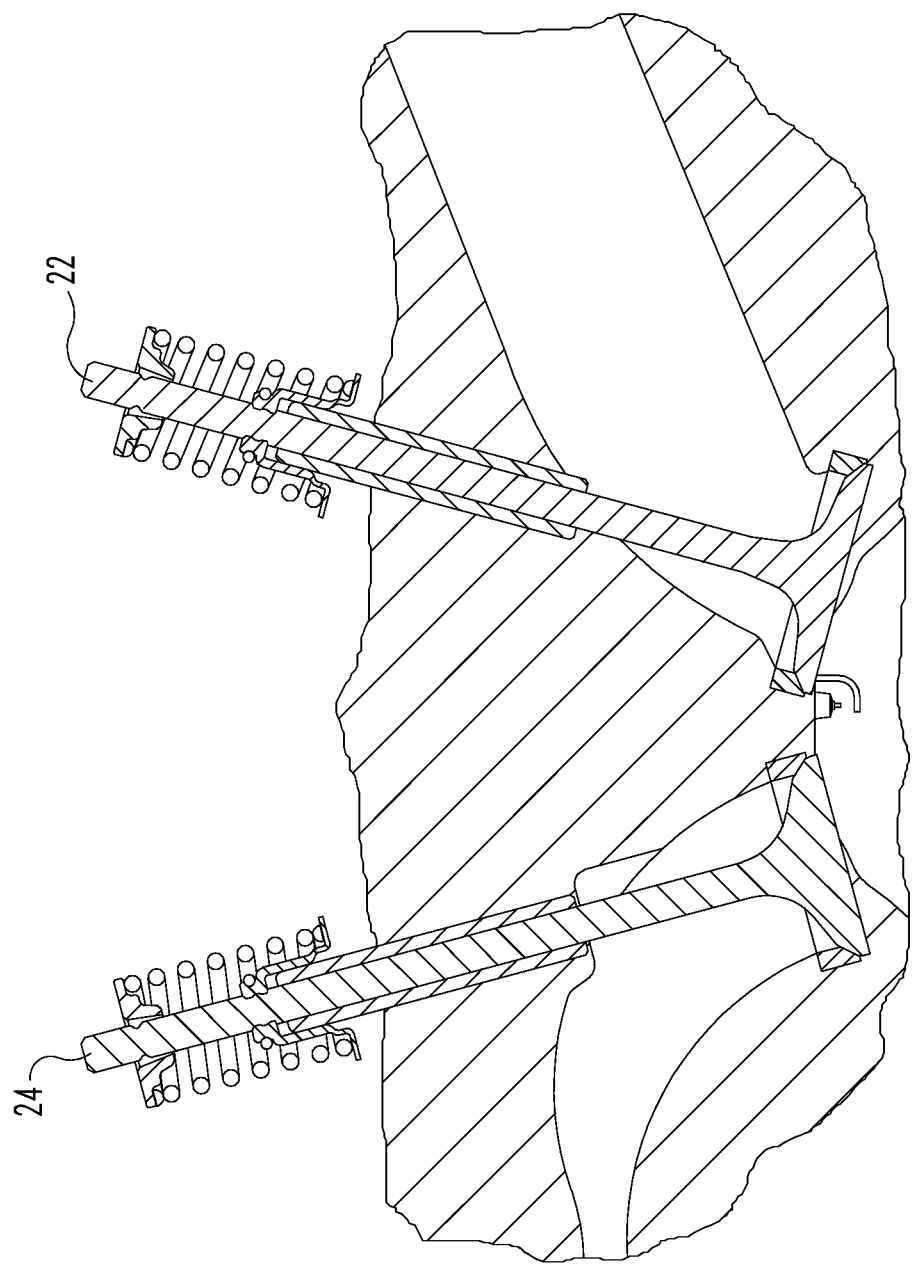

Referring to FIGS. 3-4B, further details regarding one embodiment of VA system 90 is shown that is applicable to provide cylinder deactivation of a first part of the cylinders 14 under cylinder deactivation conditions and compression release of a second part of the cylinders 14 under compression release conditions. Specifically, the VA system 90 includes a first arrangement that is controlled to engage the cam lobes of the intake and the exhaust valves of the first part of the cylinders 14 to provide a nominal lift profile or switch to provide a cylinder deactivation (CDA) lift profile. The VA system 90 also includes a second arrangement is controlled to engage the cam lobes of the intake and/or the exhaust valves of the second part of the cylinders 14 to provide a nominal lift profile or switch to provide a compression release profile that can be used for compression release braking or compression release during non-braking conditions, such as during engine cranking.

VA system 90 includes a valve train assembly 110 that utilizes an intake camshaft 112 for controlling the intake valves 22 and an exhaust camshaft 114 for controlling the exhaust valves 24. The intake camshaft 112 includes intake cams with camshaft lobes 116 that are connected to the intake valves 22 with a tappet arrangement 118. The exhaust camshaft 114 includes exhaust cams with camshaft lobes 120 that are connected to the exhaust valves 24 with a tappet arrangement 122. In other embodiments, a concentric camshaft and/or rocker lever arrangement can be used for the intake and exhaust valves opening and closing.

A phaser assembly 100 can be used to control the phase angle of the intake camshaft lobes(s) 116 and/or to control the phase angle of the exhaust camshaft lobes(s) 120. The cam shafts 112, 114 are supported on a camshaft carrier 101. The phaser assembly 100 can include a chain drive 102 to link the intake and exhaust camshafts 112, 114, and also includes intake and exhaust phaser shuttle valves 105, 107, respectively. Other embodiments contemplate separate phasers for camshafts 112, 114. Camshafts 112, 114 can be controlled independently of one another to vary a position of the respective camshaft lobes 116, 120 with respect to the tappet arrangements 118, 122, or so that the intake camshaft lobe(s) 116, 120 are not phased and remain in sync with the engine's traditional camshaft drive mechanism. The tappet arrangements 118, 122 can be controlled for cylinder deactivation or so that a desired portion of the profile of the associated camshaft lobes 116, 120 operates to open and close the intake and exhaust valves 22, 24.

Figure 5:
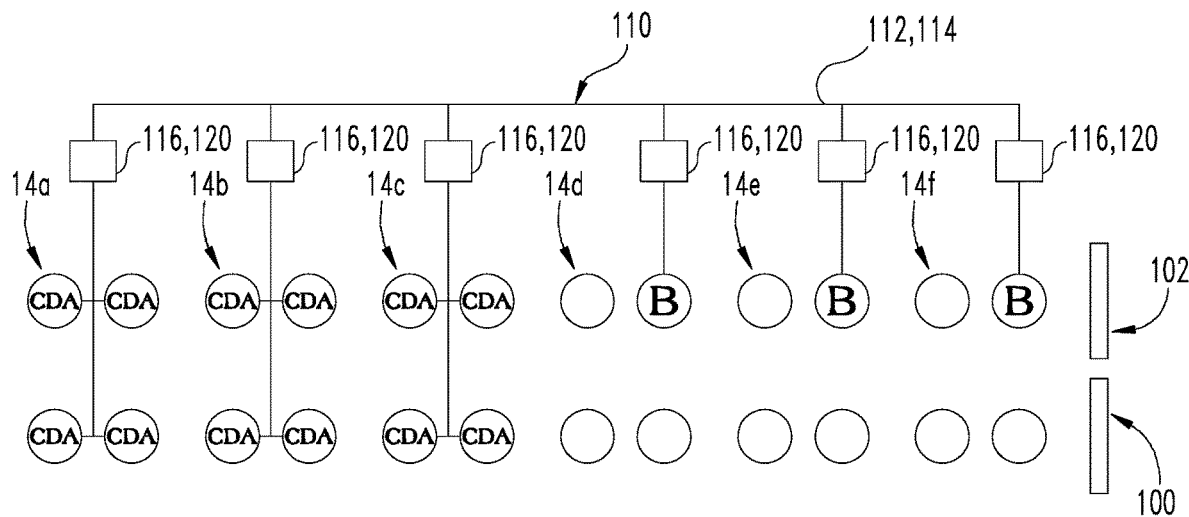
FIG. 5 is a schematic of one embodiment of a valve train and cylinder arrangement for compression release braking and cylinder deactivation.
Figure 8:
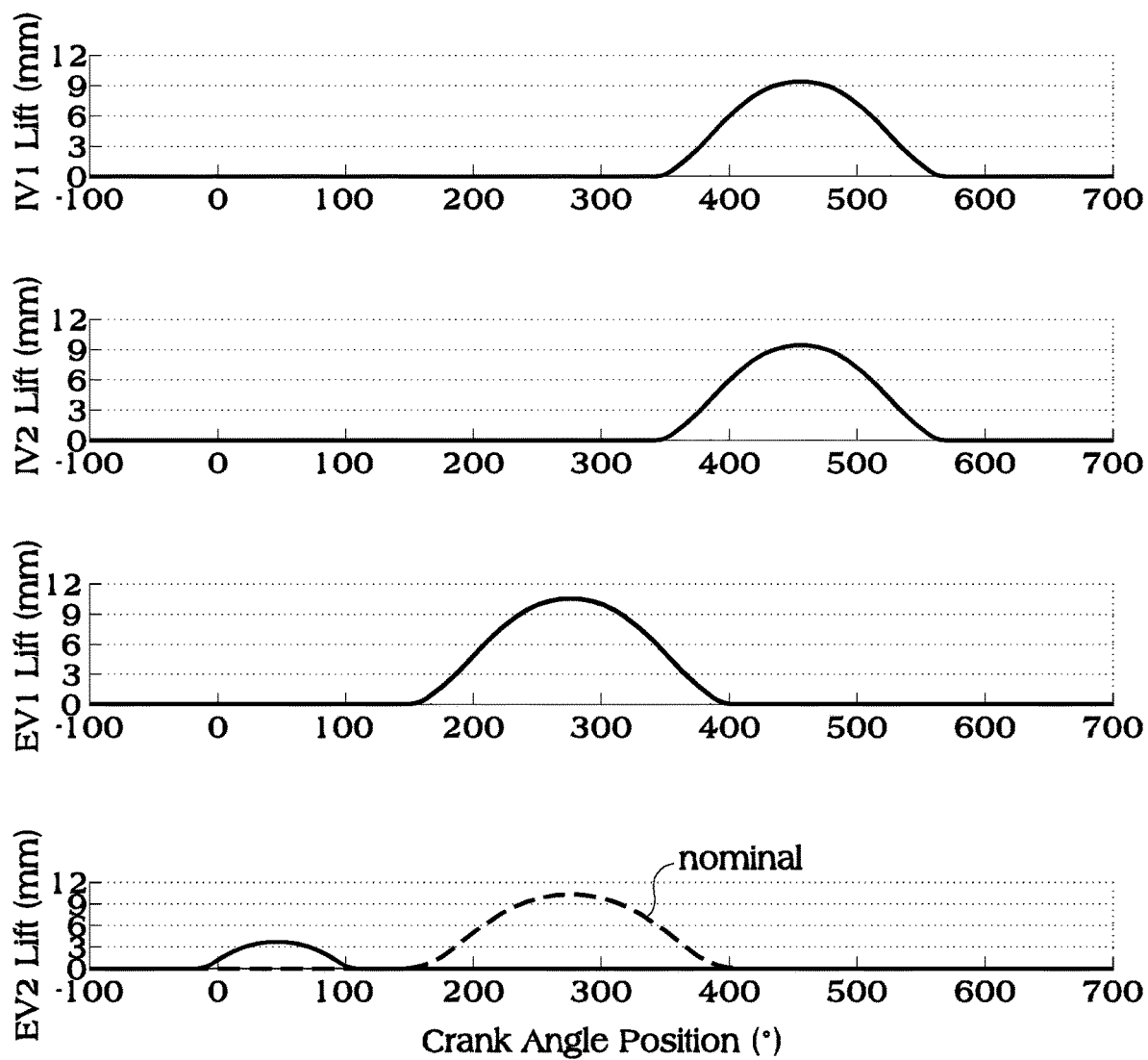
FIG. 8 is a graphical representation of an example four stroke compression release cam lobe profile for operating the intake valves and the exhaust valves of the cylinders of the internal combustion engine system of FIG. 1.

For example, referring to FIG. 5 there is shown a schematic of one embodiment of a valve train and cylinder arrangement for compression release braking and cylinder deactivation. In FIG. 5, each of the cylinders 14a, 14b, 14c is controlled for cylinder deactivation in response to a deactivation condition, such as during a low engine load condition. During cylinder deactivation, the intake valves 22 and the exhaust valves 24 of each cylinder 14a, 14b, 14c remains closed and no fueling is provided. In response to a braking condition, one of the exhaust valves 24 of each of the cylinders 14d, 14e, 14f is controlled for four stroke compression release braking. As shown in FIG. 8, under compression release braking, IV1, IV2 and EV1 can continue to operate according to their nominal opening and closing profile. However, EV2 is not opened during the exhaust stroke as would occur during operation with its nominal profile, but rather is opened at the end of the compression stroke and during the power stroke for a smaller lift and shorter duration as compared to its nominal lift profile during the exhaust stroke, as shown in FIG. 7 and by the dashed lines in FIG. 8.

Figure 6:
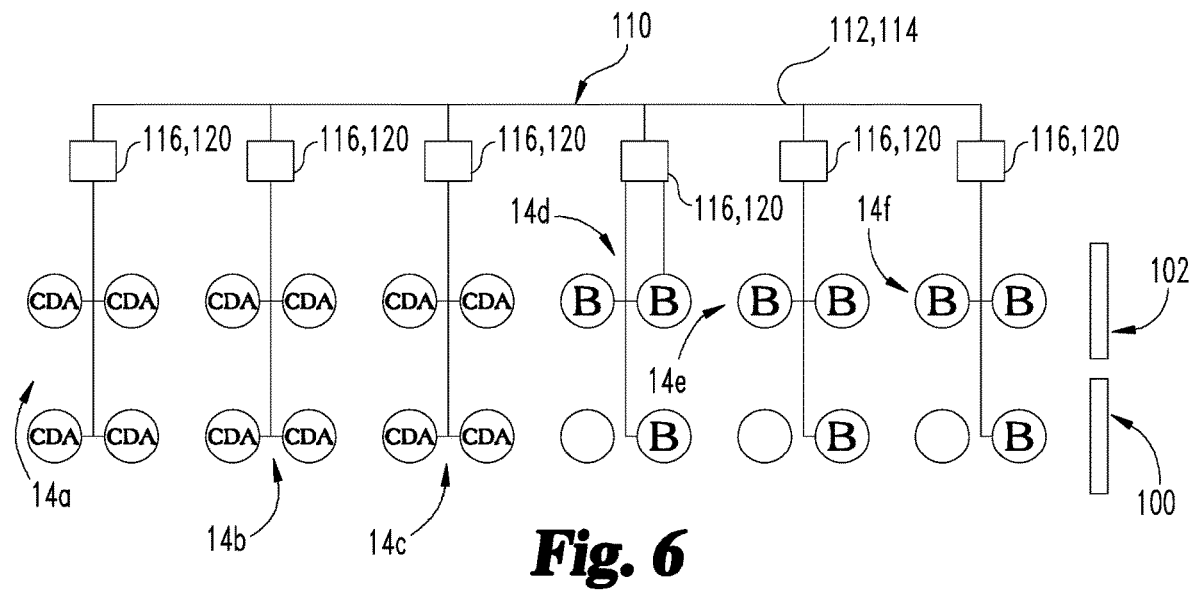
FIG. 6 is a schematic of another embodiment of a valve train and cylinder arrangement for compression release braking and cylinder deactivation.

In another example, referring to FIG. 6 there is shown a schematic of another embodiment of a valve train and cylinder arrangement for compression release braking and cylinder deactivation. In FIG. 6, each of the cylinders 14a, 14b, 14c is controlled for cylinder deactivation in response to a deactivation condition, such as during a low engine load condition. During cylinder deactivation, the intake valves 22 and the exhaust valves 24 of each cylinder 14a, 14b, 14c remains closed and no fueling is provided. In response to a braking condition, each of the exhaust valves 24 and one of the intake valves 22 of each of the cylinders 14d, 14e, 14f is controlled for two stroke compression release braking.

Figure 9:
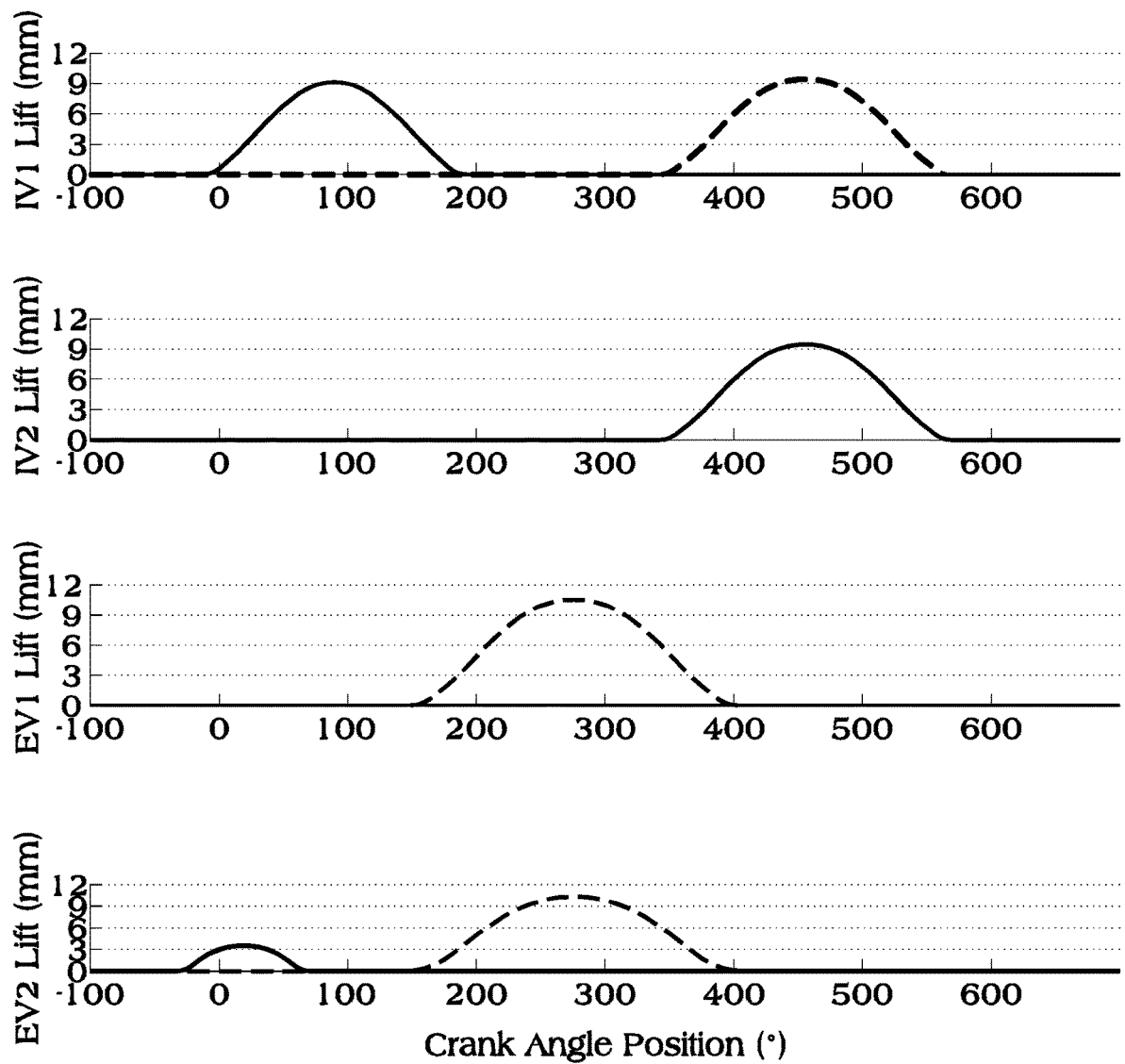
FIG. 9 is a graphical representation of an example two stroke compression release cam lobe profile for operating the intake valves and the exhaust valves of the cylinders of the internal combustion engine system of FIG. 1.

As shown in FIG. 9, under two stroke compression release braking, IV2 can continue to operate according to its nominal opening and closing profile. In contrast to four stroke compression release braking, IV1 remains closed during the intake stroke (IV1 normally opens during the intake stroke as shown in FIG. 7 and dashed lines in FIG. 9) but opens during the compression stroke. In addition, EV1 is deactivated and remains closed during the entire four stroke combustion cycle, and EV2 is not opened during the exhaust stroke as would occur during operation with its nominal profile, but rather is opened at the end of the compression stroke and during the power stroke, as shown in FIG. 9 in solid lines, for a smaller lift and shorter duration as compared to its nominal lift profile during the exhaust stroke, as shown in FIG. 7 and by the dashed lines in FIG. 9. By providing two stroke compression braking on half of the cylinders 14, a braking amount can be provided that is similar to a braking effort provided by four stroke compression braking with all of the cylinders 14. In one embodiment, compressed gas is released out the intake valve 22 in one cycle, and then compressed gas is pulled back into the cylinder 14 and released out of the exhaust valve 24 in the next cycle.

Figure 10:
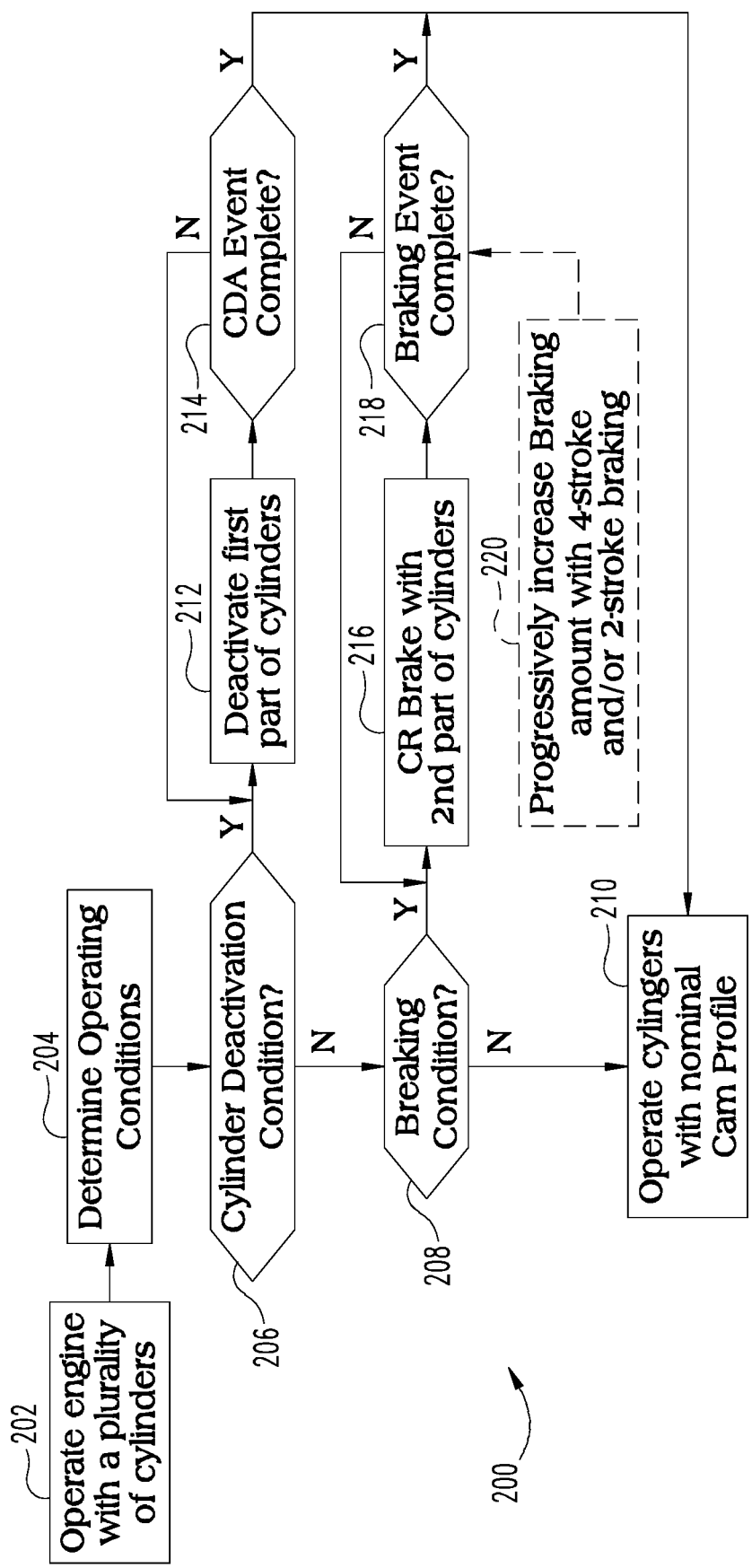
FIG. 10 is a flow diagram of one embodiment of a procedure for operation of the internal combustion engine system of FIG. 1 to provide compression release braking and cylinder deactivation.

Referring to FIG. 10, a flow diagram of one embodiment of a procedure 200 for cylinder deactivation and compression release engine braking is provided. The procedure 200 includes an operation 202 that includes operating the internal combustion engine system 10 including internal combustion engine 12 with a plurality of cylinders 14 that receive a charge flow from intake passage 36. Furthermore, at least a portion of the plurality of cylinders 14 receives fuel from fuel system 30 in response to a vehicle or engine speed request.

Procedure 200 continues at operation 204 to determine operating conditions for the internal combustion engine. The operating conditions can include any one or more parameters indicate of a cylinder deactivation condition or an engine braking condition. Procedure 200 continues at conditional 206 to determine the presence or absence of a cylinder deactivation condition. If conditional 206 is negative, procedure 200 continues at conditional 208 to determine if an engine braking request is absent or present. If conditional 208 is negative, procedure 200 continues at operation 210 to operate the cylinders 214 according the nominal opening and closing profiles for the intake valves 22 and exhaust valves 24, such as shown in FIG. 7. Procedure 200 can restart from operation 210 and/or continue to monitor for operating conditions.

In response to conditional 206 being positive indicating a cylinder deactivation condition, procedure 200 continues at operation 212 to deactivate a first part of the cylinders 14. The opening and closing profile for the cam lobes of the deactivated cylinders can include a zero lift profile for the intake and exhaust valves 22, 24. The remaining part of the cylinders 14 operate according to their nominal opening and closing profiles. Procedure 200 continues at conditional 214 to determine if the cylinder deactivation conditions are still present. If conditional 14 is positive, procedure 200 continues at operation 212. If conditional 214 is negative, procedure 200 continues at operation 210.

If conditional 208 is positive, procedure 200 continues at operation 216 to provide compression release (CR) braking with a second part of the cylinders 14. The second part of the cylinders 14 does not include the first part of the cylinders 14 that are operable for cylinder deactivation. The compression release braking can be applied to that part of the cylinders 14 by four stroke compression release braking with the exhaust valves 24 as shown in FIG. 8 or two stroke compression release braking with the intake valves 22 and the exhaust valves 24 as shown in FIG. 9. The determination of the engine braking request being present can result from, for example, an input from a vehicle operator such as a brake pedal position, accelerator pedal position, or engine brake request input switch. Procedure 200 continues at conditional 218 to determine if the braking request is still present. If conditional 218 is positive, compression release braking continues at operation 216. If conditional 128 is negative, procedure 200 continues at operation 210.

In certain embodiments of procedure 200, there is included an operation 220 to progressively increase the braking amount that is applied by compression release braking. For example, operation 220 can first include closing the intake throttle 42 response to conditional 204 determining an engine braking request being present, then applying four stroke compression release braking with a part of the cylinders 14 such as shown in FIG. 5 with, for example, the valve opening profile of FIG. 8. If additional braking effort is required, procedure 200 can continue by opening the intake throttle to increase the intake pressure and further increase the braking effort while four stroke compression braking is applied. If further braking effort is required after the intake throttle 42 is opened, then the intake throttle 42 is closed while the compression release braking profile is switched to two stroke compression braking for the part of the cylinders involved in compression release braking as shown in FIGS. 6 and 9. The intake throttle 42 can then be opened if further braking efforts is required while providing two stroke compression braking.

During operation of the internal combustion engine system 10, the controller 80 can receive information from the various sensors listed above through I/O interface(s), process the received information using a processor based on an algorithm stored in a memory of the controller 80, and then send command signals to the various actuators through the I/O interface. For example, the controller 80 can receive information regarding cylinder deactivation condition or an engine braking request, a vehicle or engine speed request, and/or an engine load condition. The controller 80 is configured to process the requests and/or temperature input(s), and then based on the control strategy, such as procedure 200 discussed above, send one or more command signals to one or more actuators to provide cylinder deactivation or compression release braking using the associated engine braking cam lobes. Controller 80 can also estimate the braking effort to be applied based on predictions, such as by using look-ahead algorithms with GPS implementation to determine whether the braking effort required will most align with a four stroke version or a two stroke version on the CR cylinders and switch to the determined profile when starting the compression release braking.

The controller 80 can be configured to implement the disclosed cylinder deactivation and compression release strategies using VA system 90. In one embodiment, the disclosed method and/or controller configuration include the controller 80 providing a cylinder deactivation command or an engine braking command in response to a cylinder deactivation condition or an engine braking request that is based on one or more signals from one or more of the plurality of sensors described above for internal combustion engine system 10. The cylinder deactivation and engine braking commands control VA mechanism 90 to switch the cam lobe profiles to provide the desired intake and exhaust valve closure or opening and closing timing.

The control procedures implemented by the controller 80 can be executed by a processor of controller 80 executing program instructions (algorithms) stored in the memory of the controller 80. The descriptions herein can be implemented with internal combustion engine system 10. In certain embodiments, the internal combustion engine system 10 further includes a controller 80 structured or configured to perform certain operations to control internal combustion engine system 10 in achieving one or more target conditions. In certain embodiments, the controller forms a portion of a processing subsystem including one or more computing devices having memory, processing, and communication hardware. The controller may be a single device or a distributed device, and the functions of the controller 80 may be performed by hardware and/or by instructions encoded on a computer readable medium.

In certain embodiments, the controller 80 includes one or more modules structured to functionally execute the operations of the controller. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on a non-transient computer readable storage medium, and modules may be distributed across various hardware or other computer components.

Certain operations described herein include operations to interpret or determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted or determined parameter can be calculated, and/or by referencing a default value that is interpreted or determined to be the parameter value.

Various aspects of the present disclosure are contemplated as described in the claims. According to one aspect, a method includes operating an internal combustion engine system including an internal combustion engine with a plurality of cylinders that receive a charge flow for combustion of a fuel provided to at least a portion of the plurality of cylinders; deactivating a first part of the plurality of cylinders in response to a cylinder deactivation condition; and braking the internal combustion engine in response to a braking condition, wherein braking the internal combustion engine is distinct from deactivating the first part of the plurality of cylinders and includes adjusting at least an exhaust valve opening and closing timing of a second part of the plurality of cylinders to provide compression release braking.

In one embodiment of the method, wherein braking the internal combustion engine includes adjusting both the exhaust valve opening and closing timing and an intake valve opening and closing timing of the second part of the plurality of cylinders to provide compression release braking. In another embodiment, the first part of the plurality of cylinders is one half of the plurality of cylinders and the second part of the plurality of cylinders is the other half of the plurality of cylinders.

According to another embodiment of the method, the internal combustion engine receives the charge flow from an intake system having an intake throttle. In response to the braking condition, the method includes closing the intake throttle; adjusting the exhaust valve opening and closing timing of the second part of the plurality of cylinders to provide four stroke compression release braking after closing the intake throttle; and opening the intake throttle to increase a braking amount while providing four stroke compression release braking. In a refinement of this embodiment, the method includes, after opening the intake throttle, closing the intake throttle while adjusting the intake valve opening and closing timing of the second part of the plurality of cylinders to provide two stroke compression release braking to further increase the braking amount. In yet a further refinement, the method includes opening the intake throttle to further increase the braking amount while providing the two stroke compression release braking.

In another embodiment of the method, adjusting at least the exhaust valve opening and closing timing of the second part of the plurality of cylinders includes switching a valve lift profile of at least one exhaust valve of each of the second part of the plurality of cylinders from a nominal valve lift profile to a compression release lift profile. In a refinement of this embodiment, braking the internal combustion engine further includes providing a two stroke compression release braking by switching a valve lift profile of at least one intake valve of each of the second part of the plurality of cylinders from a nominal valve lift profile to a compression release lift profile.

According to another aspect, a system includes an internal combustion engine including a plurality of cylinders that receive a charge flow from an intake system and an exhaust system for receiving exhaust gas produced by combustion of a fuel provided to at least a portion of the plurality of cylinders. A plurality of sensors are operable to provide signals indicating operating conditions of the system, and a valve actuation mechanism is configured to control an opening and closing timing of exhaust valves and intake valves associated with the plurality of cylinders. The system also includes a controller connected to the plurality of sensors operable to interpret one or more signals from the plurality of sensors. The controller, in response to a cylinder deactivation condition, is configured to control the valve actuation mechanism to deactivate a first part of the plurality of cylinders and, in response to a braking condition, adjust a timing of an exhaust valve opening and an exhaust valve closing of a second part of the plurality of cylinders to provide compression release braking.

In one embodiment, the first part of the cylinders is distinct from the second part of the cylinders, and the cylinder deactivation condition is a distinct event from the braking condition. In another embodiment, the intake system includes an intake throttle and the controller is configured to modulate the intake throttle in response to the braking condition. In yet another embodiment, the valve actuation mechanism is configured to deactivate the first part of the plurality of cylinders provide compression release braking for the second part of the plurality of cylinders.

In another embodiment, the controller is configured to adjust a timing of an intake valve opening and an intake valve closing of the second part of the plurality of cylinders. In a refinement of this embodiment, the valve actuation mechanism includes an exhaust camshaft phaser connected to an exhaust camshaft and an intake camshaft phaser connected to an intake camshaft. In a further refinement, the exhaust camshaft includes a plurality of exhaust cam lobes associated with respective ones of a plurality of exhaust valves of the second part of the plurality of cylinders and the intake camshaft includes a plurality of intake cam lobes associated with respective ones of a plurality of intake valve of the second part of the plurality of cylinders. In yet a further refinement, each of the exhaust cam lobes and each of the intake cam lobes each include a nominal valve lift profile and a compression release braking profile.

According to another aspect, an apparatus includes a controller for connection to a plurality of sensors configured to interpret signals from the plurality of sensors associated with operation of an internal combustion engine. The controller is further configured to determine a cylinder deactivation condition from the signals of the plurality of sensors and provide a cylinder deactivation command to deactivate a first part of a plurality of cylinders of the internal combustion engine in response to the cylinder deactivation condition. The controller is further configured to determine a braking condition from the signals of the plurality of sensors and provide a braking command to adjust a timing of an exhaust valve opening and an exhaust valve closing of a second part of the plurality of cylinders to provide compression release braking.

In one embodiment, the braking command adjusts a timing of an intake valve opening and an intake valve closing of the second part of the plurality of cylinders. In a refinement of this embodiment, the braking command switches a cam lobe profile operating to open and close the exhaust valves and the intake valves of the second part of the plurality of cylinders. In a further refinement, the controller is configured to provide an intake throttle command to open or close an intake throttle of the internal combustion engine in response to the braking condition. In yet a further refinement, the controller, in response to the braking condition, is configured to: command the intake throttle to close; adjust the timing of the exhaust valve opening and the exhaust valve closing of the second part of the plurality of cylinders to provide four stroke compression release braking to provide a braking amount; and command the intake throttle to open to increase the braking amount. In still a further refinement, the controller, in response to the braking condition requiring a further increased braking amount, is further configured to: command the intake throttle to close and adjust the timing of the intake valve opening and the intake valve closing of the second part of the plurality of cylinders to provide two stroke compression release braking; and command the intake throttle to open to increase the braking amount.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
operating an internal combustion engine system including an internal combustion engine with a plurality of cylinders that receive a charge flow for combustion of a fuel provided to at least a portion of the plurality of cylinders;
deactivating at least part of the plurality of cylinders in response to a cylinder deactivation condition; and
compression release braking the internal combustion engine in response to a braking condition by adjusting at least an exhaust valve opening and closing timing of cylinders involved in the compression release braking, wherein braking condition is distinct from the cylinder deactivation condition, wherein compression release braking the internal combustion engine includes increasing a braking amount by switching from a first compression release braking to a second compression release braking.

2. The method of claim 1, wherein compression release braking the internal combustion engine includes adjusting both the exhaust valve opening and closing timing and an intake valve opening and closing timing of the cylinders involved in the compression release braking.

3. The method of claim 1, wherein adjusting at least the exhaust valve opening and closing timing includes switching a valve lift profile of at least one exhaust valve from a nominal valve lift profile to a compression release lift profile.

4. The method of claim 3, wherein braking the internal combustion engine further includes providing a two stroke compression release braking by switching a valve lift profile of at least one intake valve from a nominal valve lift profile to a compression release lift profile.

5. A method, comprising:
operating an internal combustion engine system including an internal combustion engine with a plurality of cylinders that receive a charge flow for combustion of a fuel provided to at least a portion of the plurality of cylinders;
deactivating at least part of the plurality of cylinders in response to a cylinder deactivation condition; and
in response to a braking condition, reducing the charge flow, adjusting at least an exhaust valve opening and closing timing of cylinders involved in compression release braking the internal combustion engine to provide four stroke compression release braking after reducing the charge flow, and increasing the charge flow to increase a braking amount while providing four stroke compression release braking, wherein braking condition is distinct from the cylinder deactivation condition.

6. The method of claim 5, further comprising, after increasing the charge flow, reducing the charge flow while adjusting the intake valve opening and closing timing to provide two stroke compression release braking to further increase the braking amount.

7. The method of claim 6, further comprising increasing the charge flow to further increase the braking amount while providing the two stroke compression release braking.

8. A system, comprising:
an internal combustion engine including a plurality of cylinders that receive a charge flow from an intake system and an exhaust system for receiving exhaust gas produced by combustion of a fuel provided to at least a portion of the plurality of cylinders;
a plurality of sensors operable to provide signals indicating operating conditions of the system;
a valve actuation mechanism configured to control an opening and closing timing of exhaust valves and intake valves associated with the plurality of cylinders; and
a controller connected to the plurality of sensors operable to interpret one or more signals from the plurality of sensors, wherein the controller, in response to a cylinder deactivation condition, is configured to control the valve actuation mechanism to deactivate part of the plurality of cylinders and, in response to a braking condition, provide a compression release braking by adjusting a timing of an exhaust valve opening and an exhaust valve closing of cylinders involved in the compression release braking, wherein the controller is configured to increase a braking amount by switching from a first compression release braking to a second compression release braking.

9. The system of claim 8, wherein the controller is configured to adjust a timing of an intake valve opening and an intake valve closing of the cylinders involved in the compression release braking.

10. The system of claim 8, wherein the intake system includes an intake throttle and the controller is configured to modulate the intake throttle in response to the braking condition.

11. A system, comprising:
an internal combustion engine including a plurality of cylinders that receive a charge flow from an intake system that includes an intake throttle and an exhaust system for receiving exhaust gas produced by combustion of a fuel provided to at least a portion of the plurality of cylinders;
a plurality of sensors operable to provide signals indicating operating conditions of the system;
a valve actuation mechanism configured to control an opening and closing timing of exhaust valves and intake valves associated with the plurality of cylinders; and
a controller connected to the plurality of sensors operable to interpret one or more signals from the plurality of sensors, wherein the controller, in response to a cylinder deactivation condition, is configured to control the valve actuation mechanism to deactivate part of the plurality of cylinders and, in response to a braking condition, provide a compression release braking by adjusting a timing of an exhaust valve opening and an exhaust valve closing of cylinders involved in the compression release braking, wherein the controller is configured to, in response to the braking condition, modulate the intake throttle to reduce the charge flow, adjust the exhaust valve opening and closing timing to provide four stroke compression release braking after reducing the charge flow, and increase the charge flow via the intake throttle to increase a braking amount while providing four stroke compression release braking.

12. An apparatus, comprising:
a controller for connection to a plurality of sensors configured to interpret signals from the plurality of sensors associated with operation of an internal combustion engine, wherein the controller is further configured to determine a cylinder deactivation condition from the signals of the plurality of sensors and provide a cylinder deactivation command to deactivate part of a plurality of cylinders of the internal combustion engine in response to the cylinder deactivation condition, and wherein the controller is further configured to determine a braking condition from the signals of the plurality of sensors and provide a compression release braking by adjusting a timing of an exhaust valve opening and an exhaust valve closing of cylinders involved in the compression release braking, wherein the controller is configured to increase a braking amount by switching from a first compression release braking to a second compression release braking.

13. The apparatus of claim 12, wherein the controller is configured to adjust a timing of an intake valve opening and an intake valve closing of the cylinders involved in the compression release braking.

14. The apparatus of claim 13, wherein the controller is configured to switch a cam lobe profile operating to open and close the exhaust valves and the intake valves of the cylinders involved in the compression release braking.

15. The apparatus of claim 12, wherein the controller is configured to modulate an intake throttle that provides a charge flow to the internal combustion engine in response to the braking condition.

16. The apparatus of claim 15, wherein the controller is configured to, in response to the braking condition, reduce the charge flow via the intake throttle, adjust the exhaust valve opening and closing timing to provide four stroke compression release braking after reducing the charge flow, and increase the charge flow via the intake throttle to increase a braking amount while providing four stroke compression release braking.

17. The apparatus of claim 16, wherein the controller, in response to the braking condition requiring a further increased braking amount, is further configured to:
reduce the charge flow via the intake throttle and adjust the timing of the intake valve opening and the intake valve closing of the second part of the plurality of cylinders to provide two stroke compression release braking; and
increase the charge flow via the intake throttle to increase the braking amount.

\* \* \* \* \*